(12) United States Patent
Sun et al.

(10) Patent No.: US 9,162,662 B2
(45) Date of Patent: Oct. 20, 2015

(54) VEHICLE BRAKE TRANSMISSION

(71) Applicant: Automotive Research & Testing Center, Changhua County (TW)

(72) Inventors: Fu-Xian Sun, Changhua County (TW); Jiun-Jie Chen, Changhua County (TW); Shih-Chieh Huang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 27 days.

(21) Appl. No.: 14/137,405

(22) Filed: Dec. 20, 2013

(65) Prior Publication Data
US 2015/0175143 A1 Jun. 25, 2015

(51) Int. Cl.
*F16H 48/06* (2006.01)
*B60T 13/74* (2006.01)
*F16H 19/02* (2006.01)

(52) U.S. Cl.
CPC .............. *B60T 13/746* (2013.01); *F16H 19/02* (2013.01)

(58) Field of Classification Search
CPC ....... B60T 13/746; B60T 13/74; F16H 19/02; F16H 48/06
USPC ............................. 475/149, 3, 4, 7, 336, 343
See application file for complete search history.

(56) References Cited

U.S. PATENT DOCUMENTS

| | | | | |
|---|---|---|---|---|
| 3,106,997 A | * | 10/1963 | White | 192/215 |
| 4,641,887 A | * | 2/1987 | Klueting | 297/362 |
| 8,307,960 B2 | * | 11/2012 | Seuser et al. | 188/162 |
| 8,313,403 B2 | * | 11/2012 | Wilson, Jr. | 475/149 |
| 2002/0111241 A1 | * | 8/2002 | Kujira et al. | 475/149 |
| 2004/0113489 A1 | * | 6/2004 | Iwagawa et al. | 303/155 |
| 2004/0178028 A1 | * | 9/2004 | Farmer et al. | 188/162 |
| 2007/0151816 A1 | * | 7/2007 | Gil et al. | 188/2 D |

FOREIGN PATENT DOCUMENTS

CN 101031459 B 3/2010

* cited by examiner

*Primary Examiner* — David J Hlavka
(74) *Attorney, Agent, or Firm* — Allston L. Jones; Peters Verny, LLP

(57) ABSTRACT

A vehicle brake transmission includes a housing unit, a motor assembly, and a speed reduction unit. The housing unit includes a ring gear disposed around a first axis. The motor assembly includes a motor, and a worm rod extending along a second axis perpendicular to the first axis. The speed reduction unit is disposed in the housing unit, and includes a driving member, a planet carrier, and a plurality of planet gears. The driving member includes a worm wheel meshing with the worm rod, and a sun gear centered at the first axis and meshing with the planet gears. The planet carrier includes an input shaft connected to a caliper device. The motor drives rotation of the worm shaft, the driving member, the planet gears, and the input shaft, so as to activate the caliper device.

5 Claims, 9 Drawing Sheets

VEHICLE BRAKE TRANSMISSION

BACKGROUND OF THE INVENTION

1. Field of the Invention

This invention relates to a transmission, and more particularly to a vehicle brake transmission.

2. Description of the Related Art

Referring to FIG. 1, a conventional brake transmission disclosed in Chinese Patent Publication No. 101031459 includes two belt pulleys 11 and a belt 12 that are used to transfer rotation of a motor 13 to a planetary gear speed reduction mechanism 14 to thereby activate a braking device 15. The conventional brake transmission suffers from the following disadvantages:

1. The transmission has a large number of components, thereby increasing the manufacturing and assembly costs.

2. After a long time period of use, the tightness of the belt 12 becomes poor. That is, the transmission is not durable.

3. Since it is necessary to associate the transmission with a specifically designed caliper, the transmission is difficult to be modified quickly.

SUMMARY OF THE INVENTION

The object of this invention is to provide a vehicle brake transmission that has the advantages of anti-reverse, less components, simple structure, low costs, easy assembly, high speed-reduction ratio, quick modification, convenient to use with a caliper, and high reliability.

According to this invention, a vehicle brake transmission includes a housing unit, a motor assembly, and a speed reduction unit. The housing unit includes a ring gear disposed around a first axis. The motor assembly includes a motor, and a worm rod extending along a second axis perpendicular to the first axis. The speed reduction unit is disposed in the housing unit, and includes a driving member, a planet carrier, and a plurality of planet gears. The driving member includes a worm wheel meshing with the worm rod, and a sun gear centered at the first axis and meshing with the planet gears. The planet carrier includes an input shaft connected to a caliper device. The motor drives rotation of the worm shaft, the driving member, the planet gears, and the input shaft, so as to activate the caliper device.

The vehicle brake transmission of this invention is advantageous in that, through cooperation of the worm rod and the worm wheel, when used for a long time period, power can be transmitted steadily. Furthermore, by virtue of the mechanical characteristics of the worm rod and the worm wheel, transmission of power cannot be reversed, and the speed reduction ratio can be increased. Further, since less components are used for power transmission, the vehicle brake transmission is simple in structure, and is easy to assemble. In addition, this invention is easy to be mounted to various caliper devices, and thus can be modified quickly.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
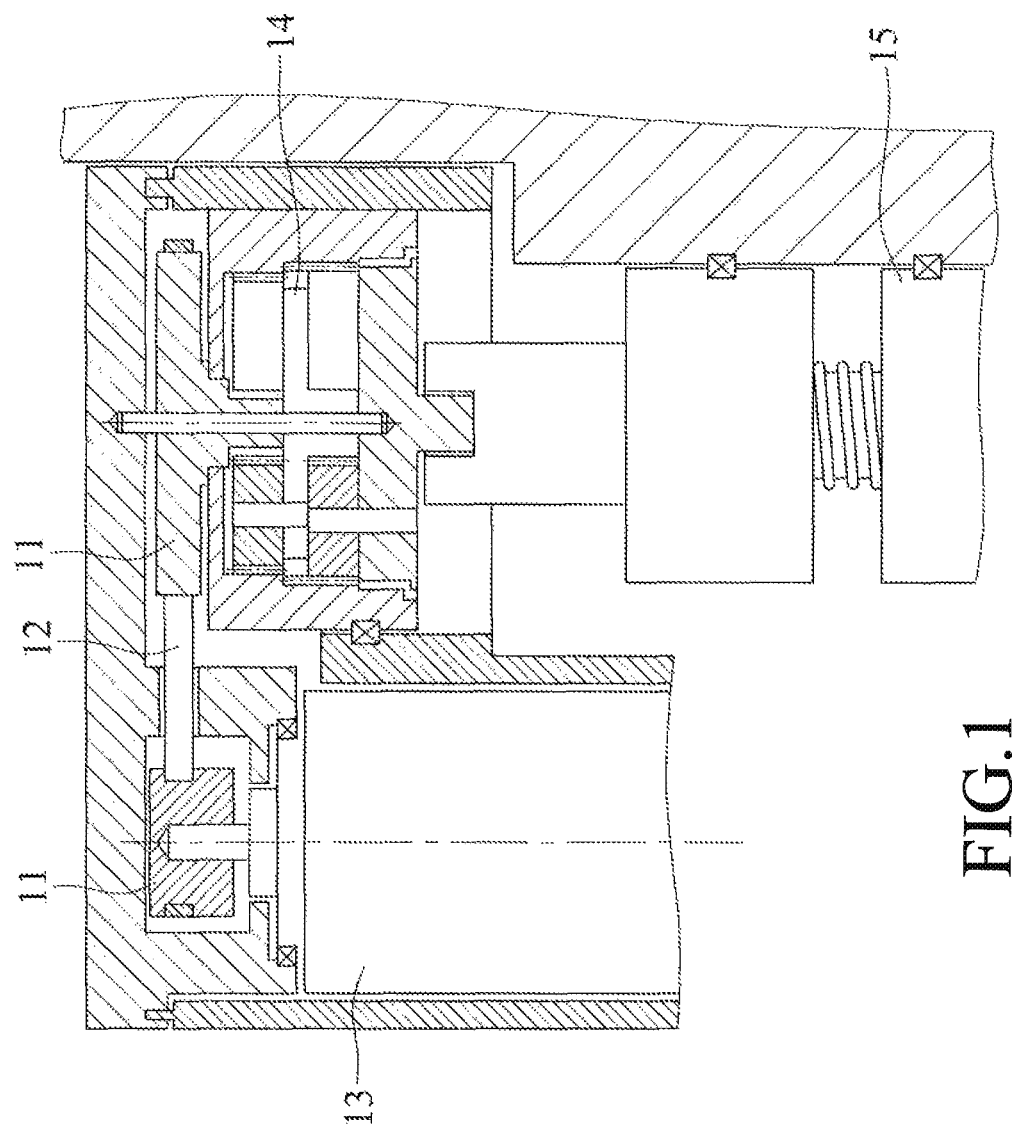
FIG. 1 is a sectional view of a conventional brake transmission disclosed in Chinese Patent Publication No. 101031459.
Figure 2:
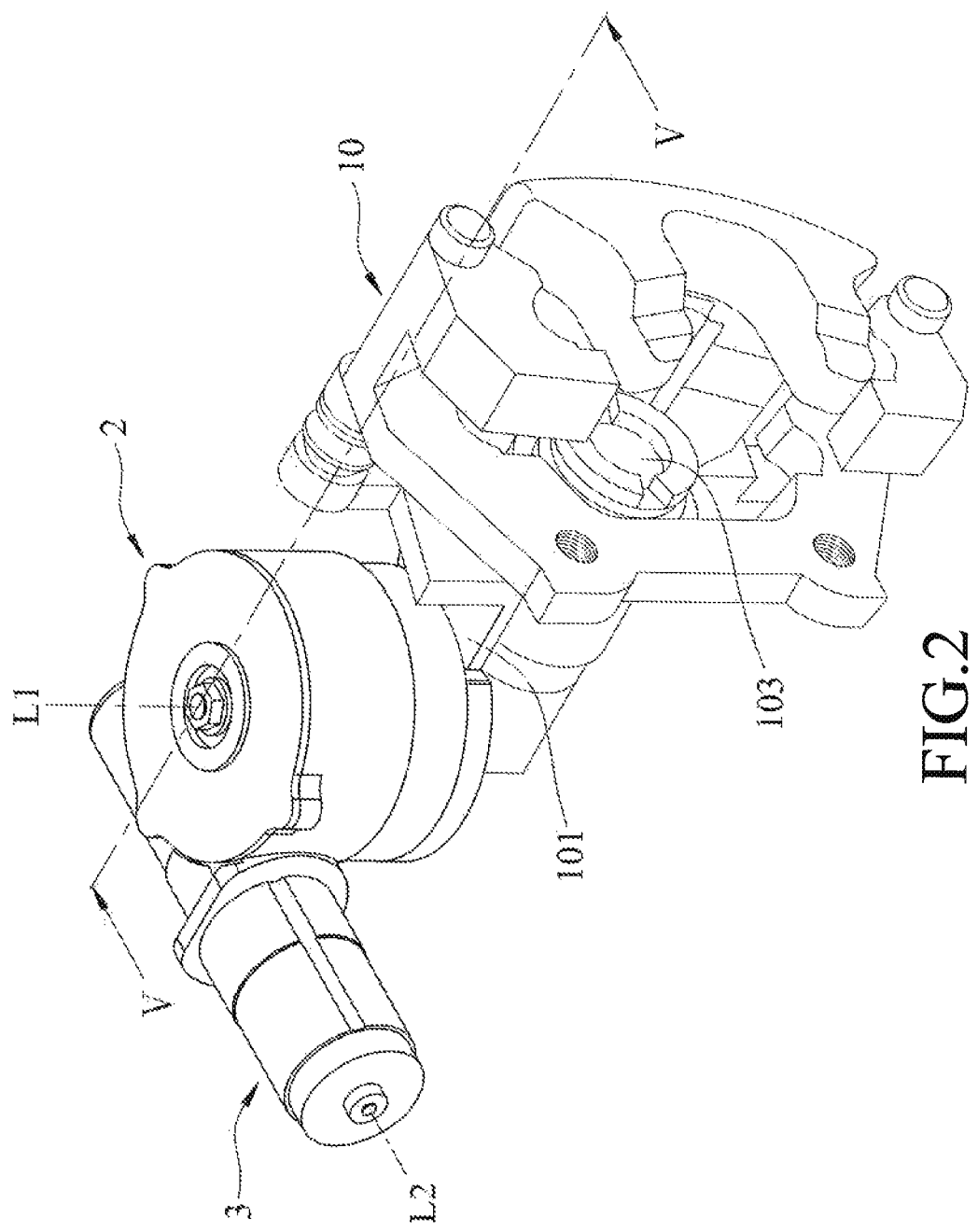
FIG. 2 is a perspective view of the first preferred embodiment of a vehicle brake transmission according to this invention.
Figure 3:
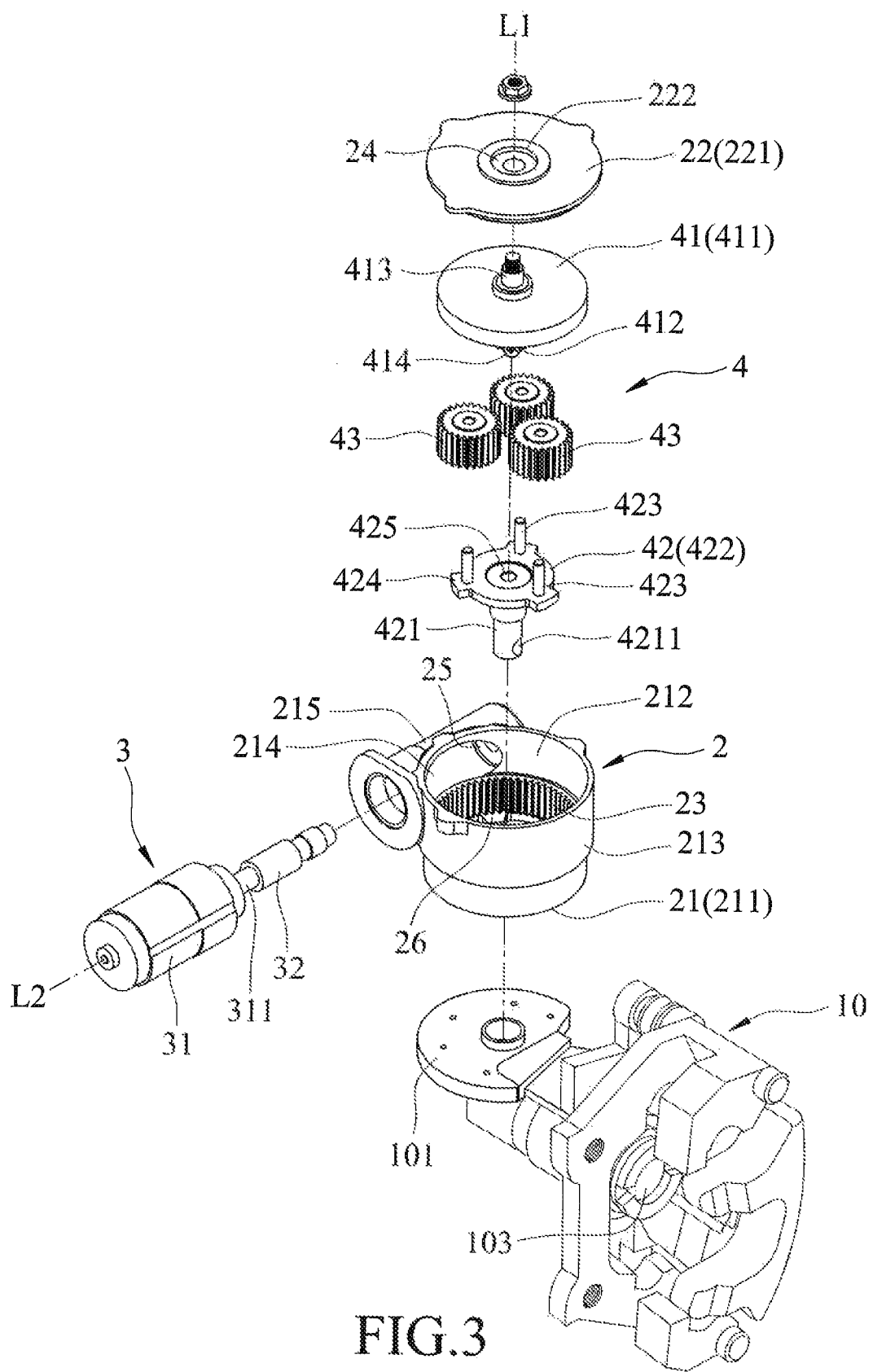
FIG. 3 is an exploded perspective view of the first preferred embodiment.

Before the present invention is described in greater detail in connection with the preferred embodiments, it should be noted that similar elements and structures are designated by like reference numerals throughout the entire disclosure.

Referring to FIGS. 2, 3, 5, and 6, the first preferred embodiment of a vehicle brake transmission according to this invention is adapted to activate a caliper device 10. The caliper device 10 includes a support seat 101, a motion transmitting rod 102 disposed on the support seat 101, and a disk driving rod 103 driven by the motion transmitting rod 102 to move a brake disk (not shown). The vehicle brake transmission includes a housing unit 2, a motor assembly 3, and a speed reduction unit 4.

The housing unit 2 includes a housing body 21 disposed on the support seat 101 of the caliper device 10, a top cover 22 connected removably to and disposed above the housing body 21, a ring gear 23 disposed around a first axis (L1) and disposed on the housing body 21, a first bearing 24 disposed on the top cover 22 along the first axis (L1), a second bearing 25 disposed on the housing body 21 along a second axis (L2), and a plurality of spaced-apart stop blocks 26 disposed on the housing body 21 and around the first axis (L1). In this embodiment, the second axis (L2) is perpendicular to the first axis (L1), and the stop blocks 26 are made of a soft material for cushioning purposes.

The housing body 21 includes a bottom wall 211 perpendicular to the first axis (L1) and disposed removably on the support seat 101, a primary surrounding wall 213 extending upwardly from an outer periphery of the bottom wall 211 to define a primary chamber 212, and a secondary surrounding wall 215 connected integrally to the primary surrounding wall 213 and disposed around the second axis (L2) to define a secondary chamber 214 in spatial communication with the primary chamber 212. The speed reduction unit 4 is disposed within the primary chamber 212. The second bearing 25 is disposed within the secondary chamber 214. The ring gear 23 is disposed on an inner surface of the primary surrounding wall 213.

The top cover 22 has a cover body 221 in the form of a horizontal plate perpendicular to the first axis (L1) for covering removably the housing body 21, and a groove 222 formed in a central portion of the cover body 221 and permitting the first bearing 24 to be received therein.

The motor assembly 3 is mounted removably to the housing unit 2, and includes a motor 31, and a worm shaft 32 disposed within the secondary chamber 214, having an end extending through the second bearing 25 along the second axis (L2), and driven by the motor 31 to rotate about the second axis (L2).

The speed reduction unit 4 includes a driving member 41 driven by the worm shaft 32 of the motor assembly 3 to rotate about the first axis (L1), a planet carrier 42 located under the driving member 41 and disposed pivotally in the housing unit 2, and a plurality of planet gears 43 disposed between the driving member 41 and the planet carrier 42 and meshing with the ring gear 23. In this embodiment, the speed reduction unit 4 is a first-stage planetary gear mechanism. Alternatively, the speed reduction unit 4 may be a multi-stage planetary gear mechanism.

The driving member 41 includes: a worm wheel 411 meshing with the worm shaft 32; a sun gear 412 connected with and disposed under the worm wheel 411, extending along the first axis (L1), and meshing with the planet gears 43; a pivot shaft 413 disposed at a top end of the driving member 41, connected integrally to and disposed above the worm wheel 411, and extending through the first bearing 24 along the first axis (L1); and a position limiting shaft 414 disposed at a bottom end of the driving member 41, connected integrally to and disposed under the worm wheel 411, and extending along the first axis (L1).

Figure 4:
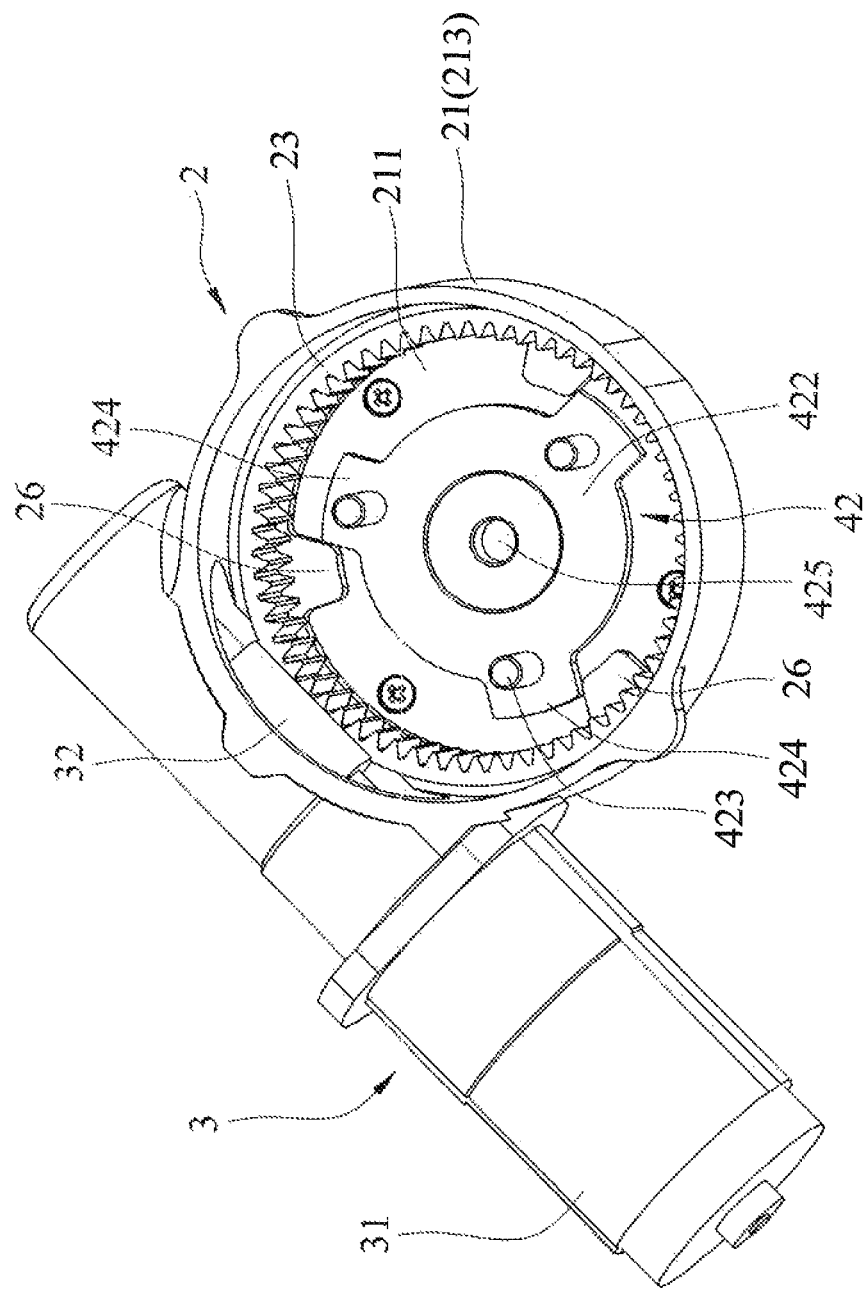
FIG. 4 is a schematic perspective view of the first preferred embodiment, wherein a caliper device, a top cover of a housing unit, a driving member of a speed reduction unit, and a plurality of planet gears are removed.
Figure 5:
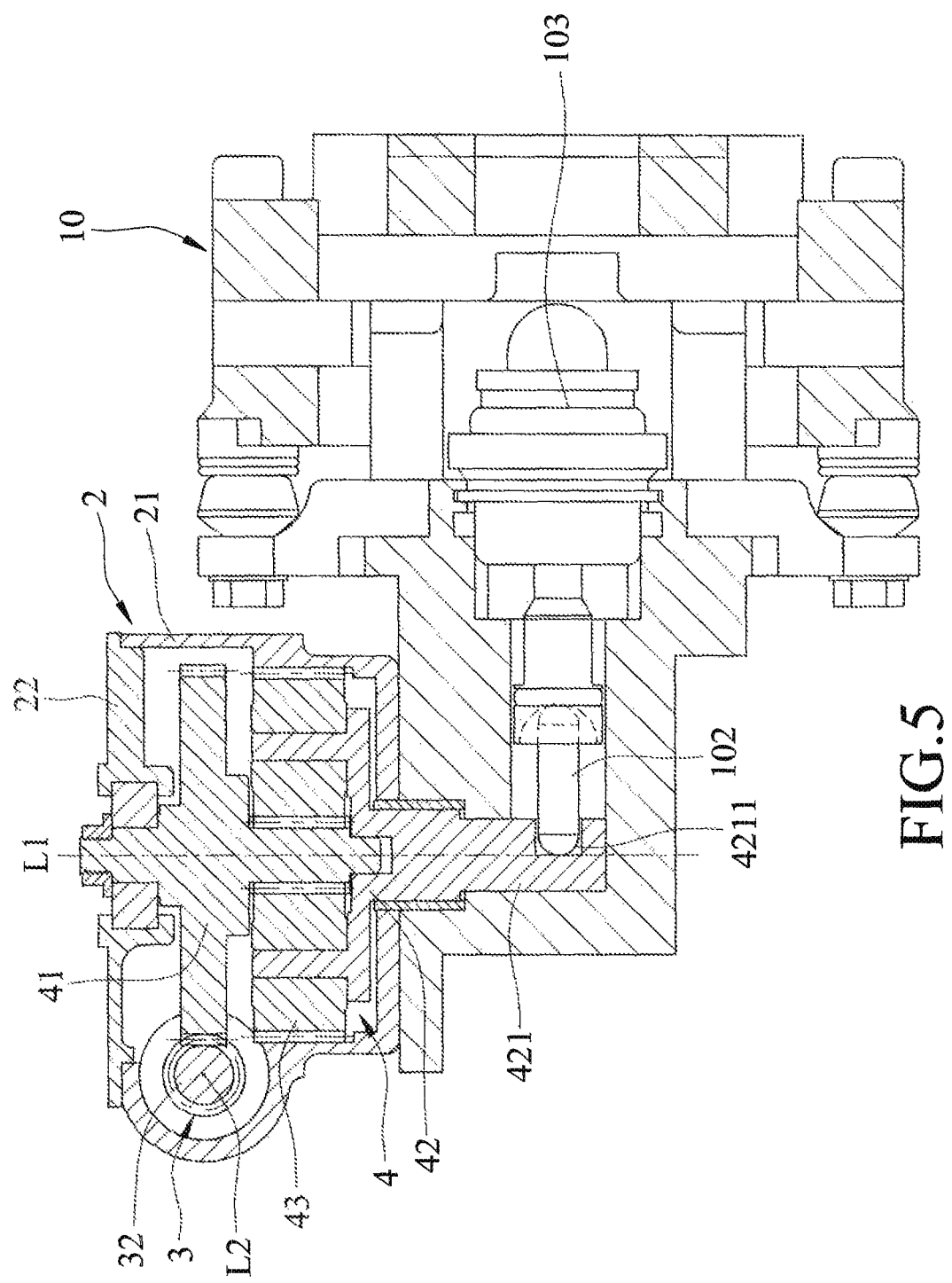
FIG. 5 is a sectional view taken along line V-V in FIG. 2.
Figure 6:
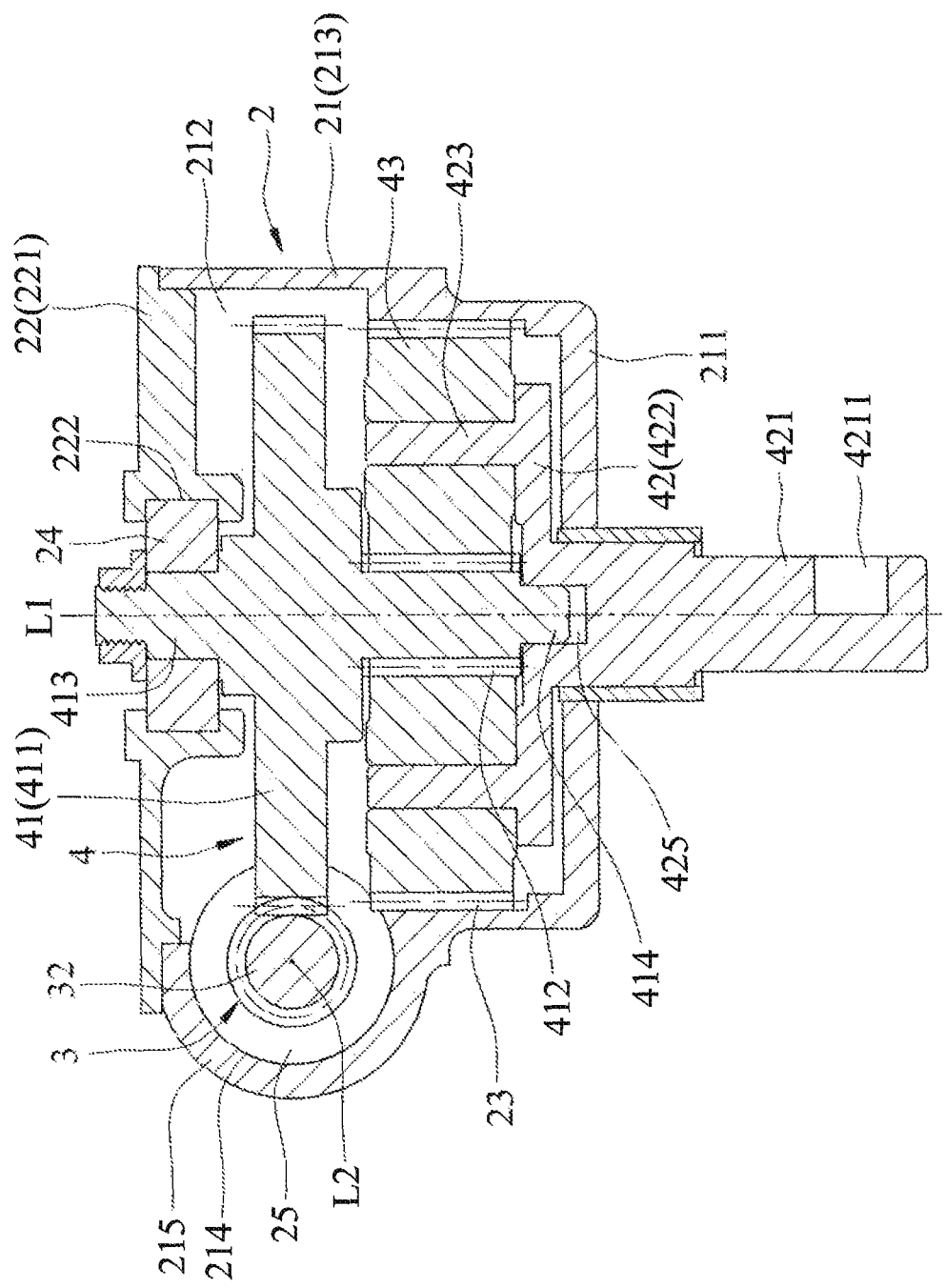
FIG. 6 is an enlarged view of a portion of FIG. 5.

With further reference to FIG. 4, the planet carrier 42 includes an input shaft 421 connected with the motion transmitting rod 102 of the caliper device 10 and extending through the bottom wall 211 of the housing body 21 along the first axis (L1) (i.e., the housing body 21 is disposed around the input shaft 421), a plate body 422 having a side surface connected to the input shaft 421, a plurality of mounting pins 423 disposed on an opposite side surface of the plate body 422 and permitting the planet gears 43 to be sleeved respectively and rotatably thereon, a plurality of projections 424 disposed on an outer periphery of the plate body 422 and each contactable with and confined between two adjacent stop blocks 26, and a position limiting hole 425 formed in a center of the plate body 422 and centered at the first axis (L1) for permitting the position limiting shaft 414 to extend therethrough. In this embodiment, the input shaft 421 has a concaved camming surface 4211 for contact with a round end of the motion transmitting rod 102, in such a manner that rotation of the input shaft 421 results in swinging movement of the motion transmitting rod 102 and, thus, movement of the disk driving rod 103. Since such a motion conversion is not pertinent to this invention, further description thereof will be omitted. It should be noted that, due to cooperation of the stop blocks 26 with the projections 424, the rotational angle of the planet carrier 42 is limited so as to prevent rotation of the input shaft 421 by an excessively large angle.

In this embodiment, the ring gear 23 is formed integrally on the primary surrounding wall 213 of the housing body 21, the worm shaft 32 and an output shaft 311 of the motor 31 are formed as one piece, the sun gear 412 and the worm wheel 411 are formed as one piece, and the plate body 422 and the input shaft 421 are formed as one piece. Alternatively, the ring gear 23 may be disposed removably on the primary surrounding wall 213 of the housing body 21, the worm shaft 32 and an output shaft of the motor 31 may be two separate members, the sun gear 412 and the worm wheel 411 may be two separate members, and the plate body 422 and the input shaft 421 may be two separate members.

The motor 31 is operable to drive rotation of the worm shaft 32 about the second axis (L2) and, thus, rotation of the worm wheel 411 of the driving member 41 about the first axis (L1). Rotation of the worm wheel 411 and the sun gear 412 is transferred to the planet carrier 42 through the planet gears 43, so as to rotate the input shaft 421 of the planet carrier 42 about the first axis (L1), thereby moving the motion transmitting rod 102 and the disk driving rod 103 to activate the brake disk. The worm shaft 32 cooperates with the worm wheel 411 to constitute a worm gear device. As compared to the above-mentioned conventional belt and pulley arrangement, the worm gear device has less components, is more durable, and allows the brake transmission to be modified more quickly. Furthermore, the worm gear device can have a higher speed reduction ratio, and thus is suitable for use in a narrower space. In a situation where a power failure is encountered, the worm gear device has an anti-reverse function so that reverse rotation of the motor 31 can be prevented.

Figure 7:
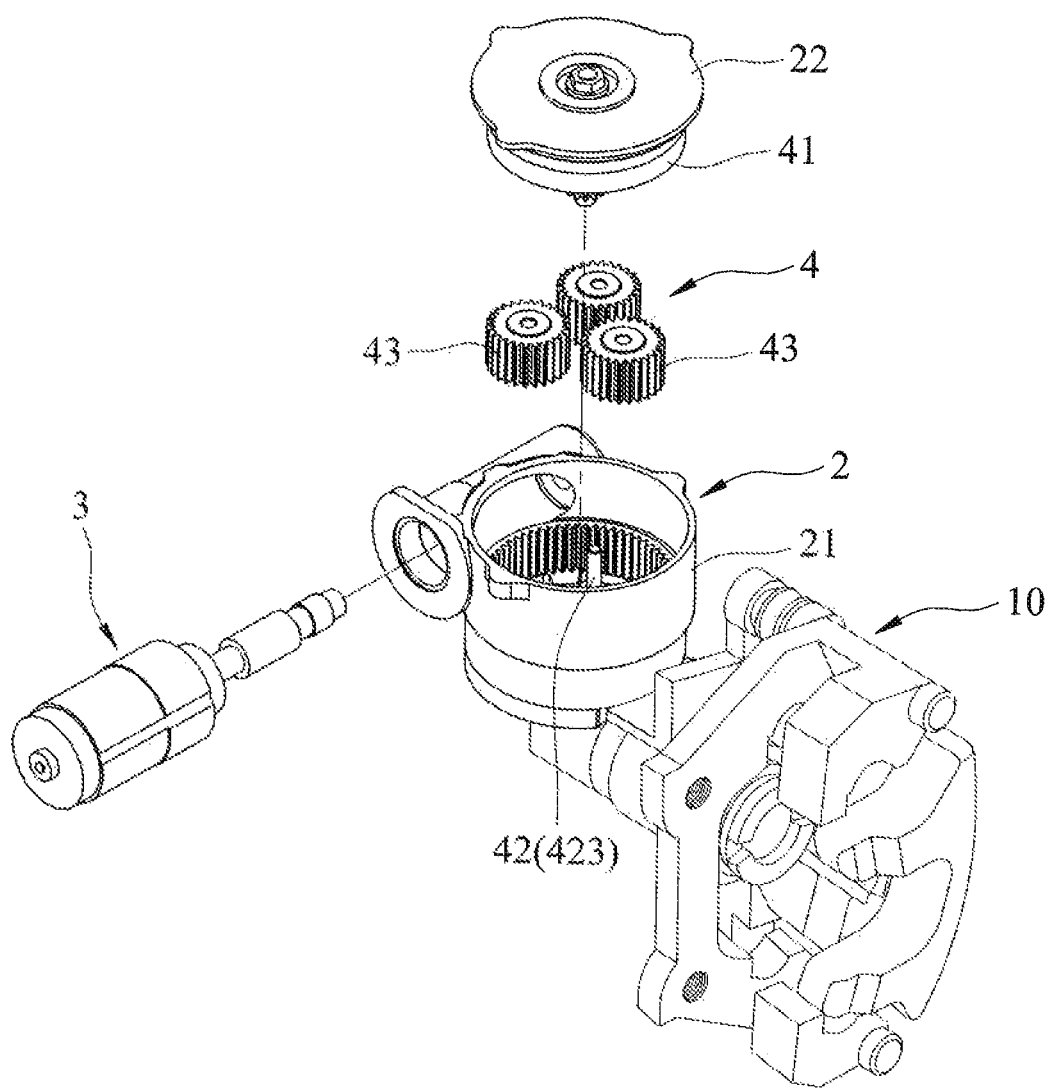
FIG. 7 is a partly exploded perspective view illustrating how to assemble the first preferred embodiment.

With particular reference to FIG. 7, during assembly, the housing body 21 and the planet carrier 42 are mounted to the caliper device 10, and the top cover 22 and the driving member 41 are assembled together. Subsequently, the planet gears 43 are sleeved respectively on the mounting pins 423. Thereafter, an assembly of the top cover 22 and the driving member 41 are mounted to the housing body 21. Finally, the motor assembly 3 is mounted to the housing body 21. As such, the vehicle brake transmission of this invention has a simple structure, and can be assembled quickly.

Figure 8:
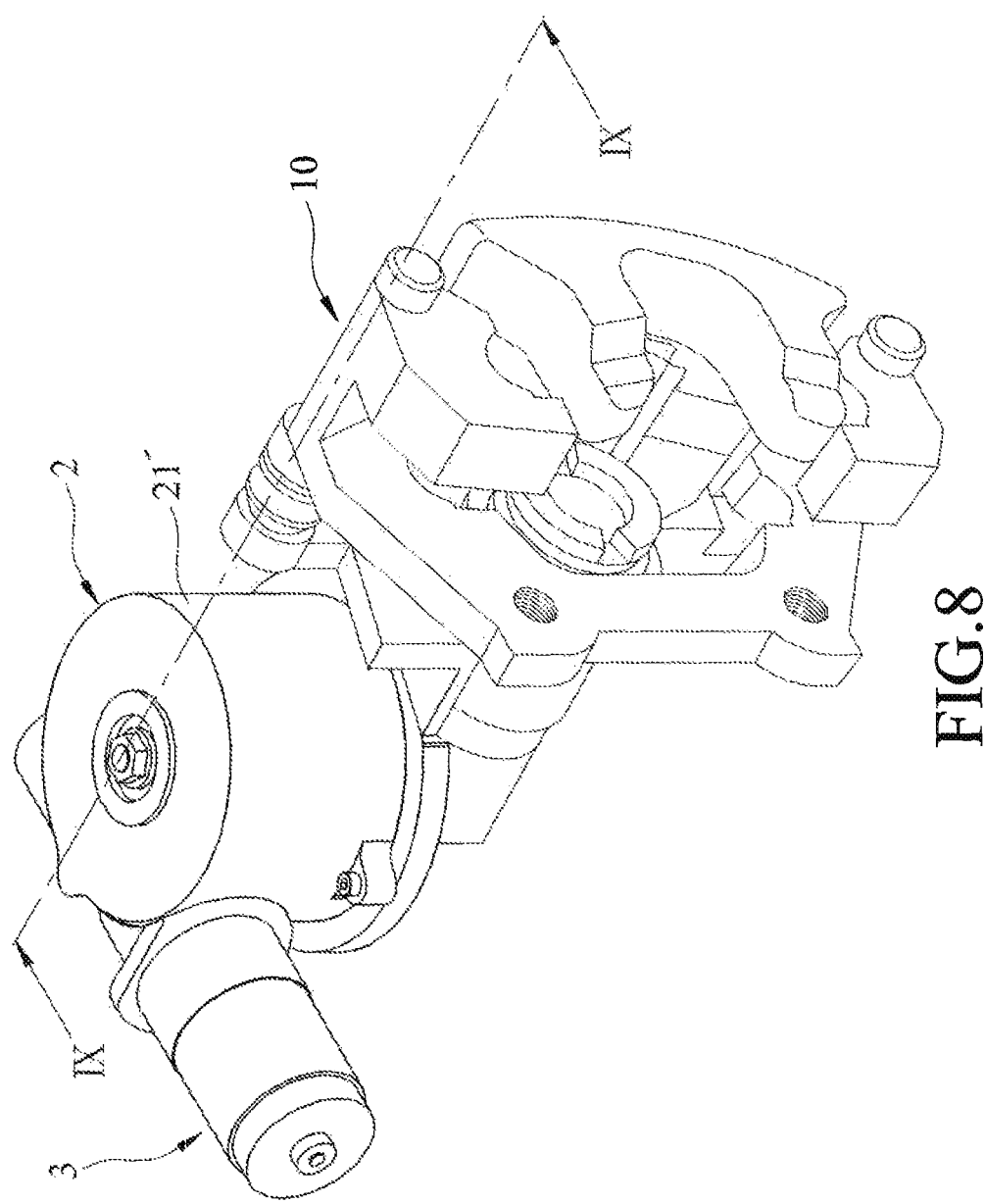
FIG. 8 is a perspective view of the second preferred embodiment of a vehicle brake transmission according to this invention.
Figure 9:
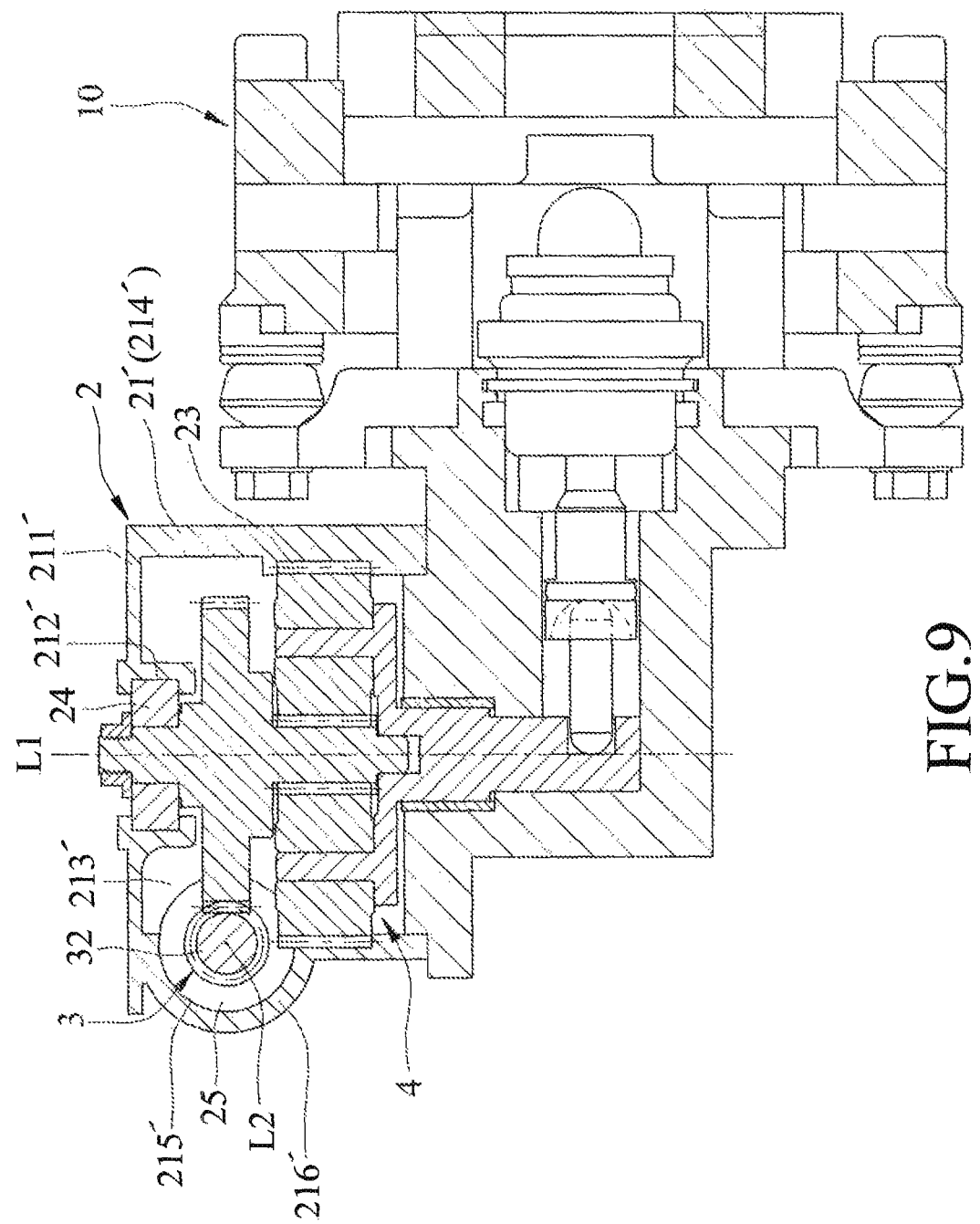
FIG. 9 is a sectional view taken along line IX-IX in FIG. 8.

FIGS. 8 and 9 show the second preferred embodiment of a vehicle brake transmission according to this invention. Unlike the first preferred embodiment, the housing unit 2 includes only a housing 21' disposed removably on the caliper device 10. The housing 21' includes a top wall 211' perpendicular to the first axis (L1), a recess 212' formed in the top wall 211', a primary surrounding wall 214' extending downwardly from an outer periphery of the top wall 211' to define a primary chamber 213', and a secondary surrounding wall 216' connected to the primary surrounding wall 214' to define a secondary chamber 215' in spatial communication with the primary chamber 213'. The speed reduction unit 4 is disposed within the primary chamber 213'. The first bearing 24 is disposed within the recess 212'. The worm shaft 32 and the second bearing 25 are disposed within the secondary chamber 215. The ring gear 23 is disposed on an inner surface of the primary surrounding wall 214'.

To sum up, the vehicle brake transmission of this invention has the following advantages:

1. As compared to the design of the belt 12 (see FIG. 1) and the belt pulleys 11 (see FIG. 1) of the above-mentioned prior art, through cooperation of the worm rod 32 and the worm wheel 411, when used for a long time period, power can be transmitted steadily.
2. By virtue of the mechanical characteristics of the worm rod 32 and the worm wheel 411, when the power supply is cut off, the reverse rotation of the motor 31 driven by the caliper device 10 can be prevented. Furthermore, an assembly of the worm rod 32 and the worm wheel 411 can have a high speed-reduction ratio, so as to allow a more than three-stage speed reduction mechanism to be modified into a two-stage speed reduction mechanism in a limited space, thereby reducing the number of the components used for power transmission. For example, such components may include only the driving member 41 and two planet gears 43. As such, the component number of this invention is smaller than that of any existing integrated caliper type electric parking brake (IEPB).
3. Since this invention has a less component number and a simple structure, and is easy to assemble, the assembly time and the manufacturing costs can be reduced effectively. Furthermore, this invention is easy to be mounted to various caliper devices, and thus can be modified quickly.

4. The driving member 41 is unitary, and includes the worm wheel 411, the sun gear 412, the pivot shaft 413, and the position limiting shaft 414. That is, the structure of the driving member 41 is new.

With this invention thus explained, it is apparent that numerous modifications and variations can be made without departing from the scope and spirit of this invention. It is therefore intended that this invention be limited only as indicated by the appended claims.

We claim:

1. A vehicle brake transmission adapted for activating a caliper device, said vehicle brake transmission comprising:

a housing unit including a ring gear disposed around a first axis;

a motor assembly mounted to said housing unit and including a motor, and a worm shaft driven by said motor to rotate about a second axis perpendicular to said first axis; and a speed reduction unit disposed in said housing unit and including a driving member driven by said worm shaft of said motor assembly to rotate about said first axis, a planet carrier located under said driving member and disposed pivotally in said housing unit, and a plurality of planet gears meshing with said ring gear of said housing unit, said driving member including a worm wheel meshing with said worm shaft, and a sun gear connected integrally with said worm wheel, extending along said first axis, and meshing with said planet gears, said planet carrier including an input shaft adapted to be connected with said caliper device and extending along said first axis;

wherein said motor is operable to drive rotation of said worm shaft, said driving member, said planet gears, and said input shaft of said planet carrier, so as to activate said caliper device;

wherein said housing unit further includes a first bearing disposed along said first axis, and a second bearing disposed along said second axis, said planet carrier further including a position limiting hole formed in a center thereof and centered at said first axis, said driving member further including a pivot shaft disposed at a top end thereof and extending through said first bearing along said first axis, and a position limiting shaft disposed at a bottom end of said driving member and extending through said position limiting hole along said first axis, said worm shaft having an end extending through said second bearing;

wherein said housing unit further includes a housing body disposed around said input shaft and permitting said worm shaft and said speed reduction unit to be disposed therein, and a top cover connected to and disposed above said housing body; and wherein said housing body includes a bottom wall perpendicular to said first axis, a primary surrounding wall extending upwardly from an outer periphery of said bottom wall to define a primary chamber, and a secondary surrounding wall connected to said primary surrounding wall and disposed around said second axis to define a secondary chamber, said top cover having a cover body perpendicular to said first axis and covering removably said housing body, and a groove formed in a central portion of said cover body and permitting said first bearing to be received therein, said speed reduction unit being disposed within said primary chamber, said worm shaft and said second bearing being disposed within said secondary chamber, said ring gear being disposed on an inner surface of said primary surrounding wall.

2. The vehicle brake transmission as claimed in claim 1, wherein said housing unit further includes a plurality of stop blocks spaced apart from each other and disposed around said first axis for limiting rotational angle of said planet carrier.

3. The vehicle brake transmission as claimed in claim 2, wherein said stop blocks are made of a soft material.

4. The vehicle brake transmission as claimed in claim 2, wherein said planet carrier further includes a plate body having a side surface connected to said input shaft, a plurality of mounting pins disposed on an opposite side surface of said plate body and permitting said planet gears to be sleeved respectively and rotatably thereon, and a plurality of projections disposed on an outer periphery of said plate body and each contactable with and confined between two adjacent ones of said stop blocks.

5. The vehicle brake transmission as claimed in claim 1, wherein said housing unit further includes a housing adapted to be disposed removably on the caliper device, said housing including a top wall perpendicular to said first axis, a recess formed in said top wall, a primary surrounding wall extending downwardly from an outer periphery of said top wall to define a primary chamber, and a secondary surrounding wall connected to said primary surrounding wall to define a secondary chamber, said speed reduction unit being disposed within said primary chamber, said first bearing being disposed within said recess, said worm shaft and said second bearing being disposed within said secondary chamber, said ring gear being disposed on an inner surface of said primary surrounding wall.

* * * * *